Aug. 15, 1972    P. J. PINTO ET AL    3,684,457
BRINER
Filed Jan. 4, 1971    2 Sheets-Sheet 1
FIG. 1
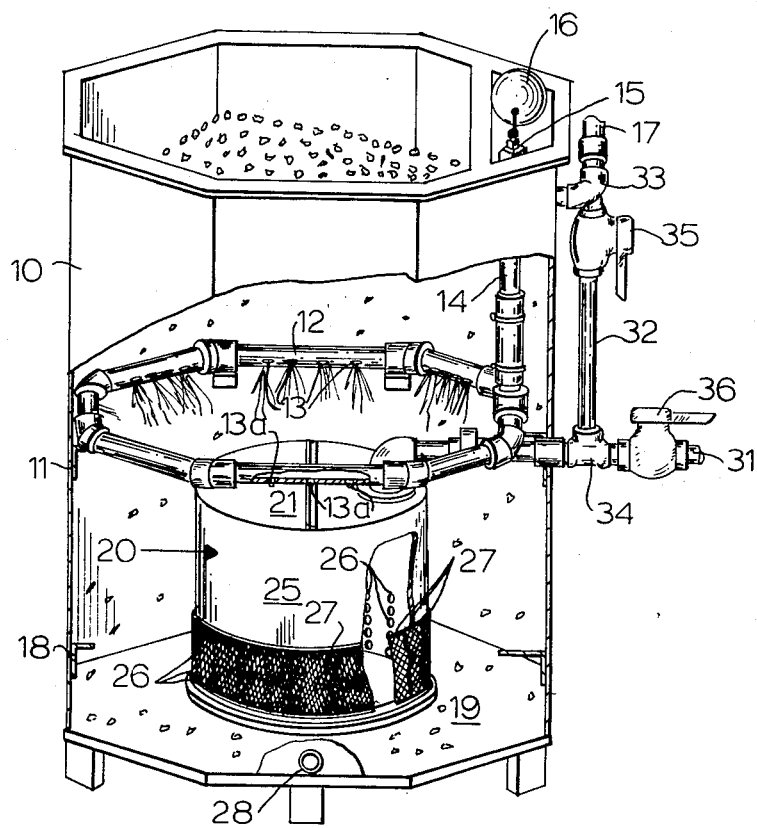
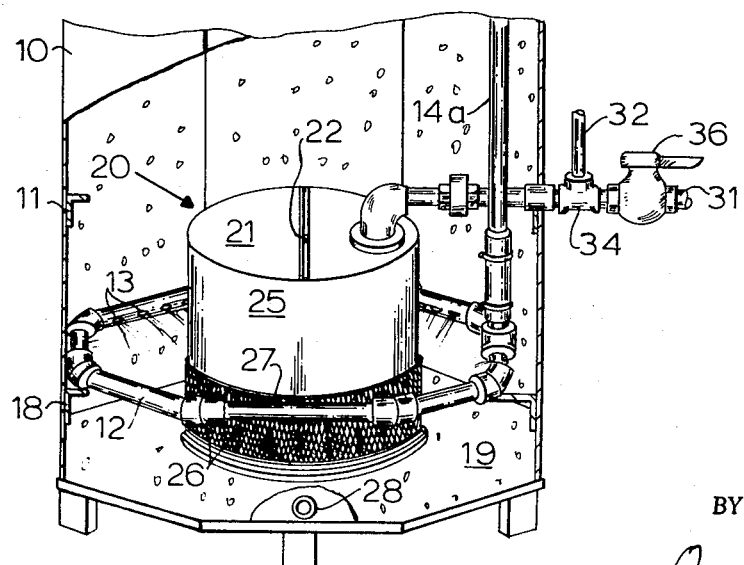
FIG. 4
INVENTOR.
PETER J. PINTO
DONALD M. KING
BY ROY B. McCARTHY
ATTORNEYS Aug. 15, 1972   P. J. PINTO ET AL   3,684,457
BRINER Filed Jan. 4, 1971   2 Sheets-Sheet 2

INVENTOR.
PETER J. PINTO
DONALD M. KING
BY ROY B. McCARTHY

Owen, Wickersham & Erickson
ATTORNEYS 3,684,457
BRINER
Peter J. Pinto, Union City, Donald M. King, Alameda, and Roy B. McCarthy, San Leandro, Calif., assignors to Leslie Salt Co., San Francisco, Calif.
Filed Jan. 4, 1971, Ser. No. 103,694
Int. Cl. B01f 1/00; C01d 3/04
U.S. Cl. 23—271                            7 Claims

ABSTRACT OF THE DISCLOSURE

A vertically disposed tank has a bottom, side wall or walls, an upper end, and a shelf or series of brackets around its wall, preferably at two levels, an upper level for kiln-dried salt and a lower level for vacuum-refined salt. A ring of tubing rests on one shelf, depending on the kind of salt being brined. The tubing has nozzles, preferably two rows, one directed downwardly and one directed inwardly and downwardly at approximately thirty degrees to horizontal. A constant water level and head is maintained. A collection drum at the bottom of the tank has a wall that is imperforate except adjacent the bottom, where openings are provided, and there is an outlet at the upper end of the drum for withdrawing the saturated solution. The openings are covered by a fine mesh screen of sufficient closeness to prevent the passage of solid salt particles while admitting the liquid saturated solution.

BACKGROUND OF THE INVENTION

This invention relates to an improved briner for producing clear saturated brine from either kiln-dried coarse salt or vacuum-refined salt.

Heretofore it has required different brining apparatus to produce saturated brine from vacuum-refined salt on the one hand and kiln-dried salt on the other. The vacuum-refined salt is such much finer than the kiln-dried salt that it tends to form a slurry that moves along with the brine or to plug openings made to withdraw the brine. It requires different conditions to dissolve the two kinds of salt. Although it is finer in texture than the kiln-dried salt, the vacuum-refined salt is no easier to dissolve and gives special problems. Again, apparatus suitable for working with the vacuum-refined salt did not heretofore do the most efficient job with the kiln-dried salt.

It is important that a brining device produce a saturated salt solution and that it do so rapidly and in quantity. Heretofore some of the briners have not been able to act fast enough, whereas the present invention provides very fast action. It solves the problem of producing brine rapidly from either kind of salt and without carrying insolubes over, so that the pure brine can be used in canning foods, even though the kiln-dried salt itself has many insolubles.

BRIEF SUMMARY OF THE INVENTION

The briner of the invention includes a main brine tank having about the bottom a ring of pipe with downwardly pointing nozzles or openings through which the water enters. The height at which the ring is held depends on the kind of salt to be used, the ring being held higher for kiln-dried salt than for vacuum-refined salt. A float valve near the upper end of the tank provides a constant head, once the initial water has gone in, and admits new water at a rate that maintains the constant head. At the bottom of the tank is an inner drum having a ring of perforations adjacent its lower end with a fine screen placed over the perforations. The upper portion of the drum is imperforate, so that all the brine enters at the lower end. The tank must be thought of as being substantially filled with salt, initially, with the water going into it from the ring and providing a saturated salt solution at the lower end of the tank. The saturated solution passes into the drum through the openings or screen. At the top of the inner drum, the saturated solution is withdrawn by an outlet conduit, so that any sediment that may get into the bottom of the drum is not carried over.

BRIEF DESCRIPTION OF THE DRAWINGS

In the drawings:
FIG. 1 is a view in perspective of a briner embodying the principles of the invention, set up for kiln-dried salt.
FIG. 4 is another view in perspective of the same briner of FIGS. 1–3 set up for vacuum-refined salt by lowering the water-injecting ring to a lower level.

DESCRIPTION OF A PREFERRED EMBODIMENT

Figure 2:
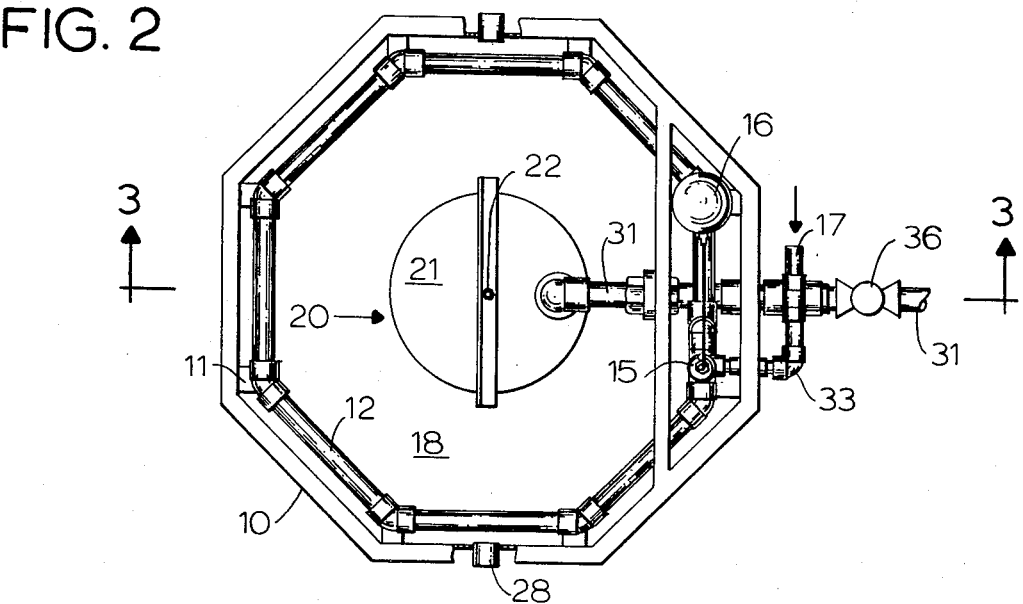
FIG. 2 is a top plan view thereof.
Figure 3:
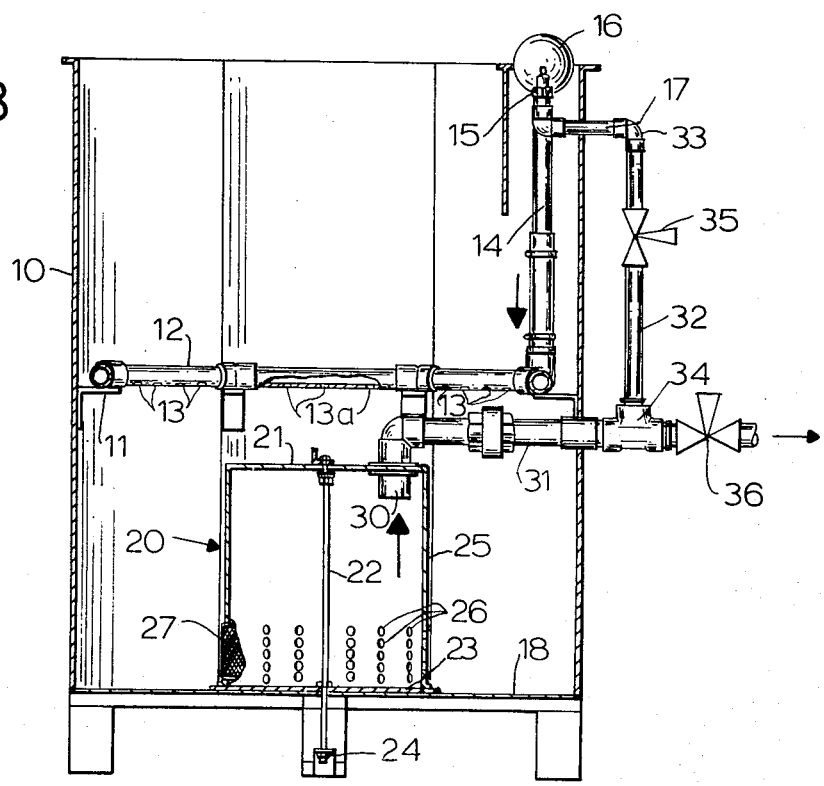
FIG. 3 is a view in section taken along the line 3—3 in FIG. 2.

In the drawings an octagonal tank 10 is shown, having set within it at a height between one-third and one-half of the way up from the bottom to the top, an upper shelf 11. The device is shown in FIGS. 1–3 for use with kiln-dried salt; so the upper shelf 11 (which may be replaced by a series of brackets) is shown supporting a ring 12 of pipe provided with nozzles 13 and 13a. The nozzles 13a point down vertically, while the nozzles 13 point in toward the center of the ring and down at about 30° below horizontal, this angle having been found to accomplish two very good results. For one thing, the downwardly and inwardly pointing nozzles 13 are better protected from salt than if they faced upwardly or horizontally and are prevented from filling up with salt. Second, in addition to the nozzles 13a on the bottom pointing vertically downwardly, the nozzles 13 spray out into the center of the salt tank 10, and the combination therefore achieve a quicker and more rapid mixture of the salt with the water, which of course aids in obtaining the desired saturated solution. Since the tank 10 is shown as octagonal, the ring 12 also is shown as octagonal, though it might be a circular ring in a circular tank, and other shapes could be used. There may be about three nozzles 13a and four nozzles 13 for each section, but there may be more or fewer nozzles, if desired.

A vertical pipe 14 leads to the ring 12 from above and is connected to a control valve 15 which is operated by a float 16. The valve 15 is fed by an inlet conduit 17. The float 16 rides on the level of the water and keeps the water at that level by opening the valve 15 whenever the float 16 drops below a desired level. Thus, outflow is balanced with inflow and a constant head is maintained, assuring constant pressure at the lower end of the tank 10. The pipes 14 and 12 and all of the pipes inside the tank 10 may be made from polyvinyl chloride or other material which is not subject to corrosion by salt. Metal parts may be made of stainless steel or Monel metal or other non-corrodible material.

A lower shelf 18 (or a series of brackets) is provided lower down in the tank 10, preferably about one-fifth to one-sixth of the way from the bottom to the top of the tank 10, and this shelf 18 is used to support the ring 12 when vacuum-refined salt is being brined. Kiln-dried salt is coarse and crystalline and there is plenty of void space between crystals, and as a result the fastest and most efficient dissolving action is obtained when the ring 12 rests on the shelf 11. In contrast, vacuum-refined salt is fine and tightly packed and when the ring 12 is supported on the shelf 11 the water works its way toward the bottom with difficulty. The most rapid and efficient dissolution of vacuum-refined salt is obtained when the ring rests on the shelf 18, which, typically, is only about nine inches above the floor 19 of the tank 10, whereas the shelf 11 is typically about twenty-four inches above the floor 19.

In moving the ring 12 from the shelf 11 to the shelf 18, a longer vertical pipe 14a replaces the pipe 14; this is the only difference in changing from the FIG. 1 made for kiln-dried salt to the FIG. 4 made for vacuum-refined salt.

In the center of the tank 10, at its lower end, is provided an inner drum 20, which is secured to the floor 19 of the tank 10 to maintain itself in a constant position. Thus, the upper wall 21 of the drum 20 is shown fastened to a rod 22 which extends down through the bottom wall 19 and is fastened to a bracket 24 below the tank 10 (FIG. 3). The drum 20 may be open at the bottom 23, so long as the lower end 23 does not let solid salt leak into the drum 20. A drain 28 is provided for draining and cleaning the tank 10.

Preferably, the drum 20 is generally cylindrical, though it could also be octagonal if desired, or other shape, and its cylindrical wall 25 is provided adjacent its lower end with a series of openings or perforations 26. There may be five rows of these openings 26, as shown, and they may each be, for example, three-quarters of an inch in diameter with, for example, twenty-seven holes around the periphery of a drum 20 which is sixteen inches in diameter. It may be interesting to note here that a typical tank 10 itself may be about four feet high and about forty inches across. This enables the tank 10 to accommodate about a ton of salt and to have an output, when used according to this invention, of about twelve hundred gallons per hour, or twenty gallons per minute, of the saturated solution, when brining kiln-dried salt, or six hundred gallons per hour or ten gallons per minute when brining vacuum-refined salt.

The openings 26 are too large to do any filtering, and the invention protects them with one or more screens 27 surrounding the drum 20 and covering the openings 26 and adapted to rest so closely adjacent the openings 26 that all the water must pass through the screen 27 in order to reach the openings 26. The screen 27 may be made from glass fiber cloth of about 0.012" thickness and should be at least seventy mesh, or finer, preferably in more than one layer; three layers are preferred and may be either separate cylindrical layers or one continuous screen wound into three laps, for example. The screen 27 is so fine that even the vacuum-dried salt cannot pass through it in a solid state, so that nothing but solution goes into the interior of the drum 20.

An inlet opening 30 of an outflow pipe 31 extends through the upper wall 21 of the drum 20. Above the top 21 of the drum 20 the pipe 31 extends horizontally out to a place where the saturated solution is desired to be used.

When back flushing is desired, an auxiliary pipe 32 may be connected to the water inlet pipe 17 at an upper T 33 and connected to a lower T 34 through a valve 35, which enables one to send the water into the outlet pipe 31 for flushing it, and there may be, similarly, a valve 36 to prevent this flushing water from going out and closed only at that time. When in use, this lower valve 36 is opened.

In use, the tank 10 is essentially filled with salt, which may be of either kind, the ring 12 being located on the shelf 11 or 18 proper for the type of salt, and then the water is admitted and flows in until it reaches the desired water level, at which point the float 16 closes the valve 15. However, the float valve 15 is constantly being opened and closed during use so that there is always incoming water to balance the outflow of water. The water shoots from the noozles 13 and 13a into the interior of the tank 10, and this action aids the achieving of a saturated solution quite soon. The saturated solution, but not the solids, is able to flow through the screen 27 and the openings 26 into the interior of the drum 20, and when it fills the drum 20, it is taken off from the upper end thereof through the outlet pipe 31. There is no entry of even vacuum refined salt into the drum 20 and insolubles are also removed by the screen 27, no matter what kind of salt is involved.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A briner including in combination:
   a vertically disposed tank having a bottom, vertical wall means, and an upper end and having support means extending in from and supported by said vertical wall means,
   a ring of tubing carried well above said botom wall by said support means adjacent to said vertical wall means and having nozzles directed inwardly and downwardly,
   supply means for supplying water to said ring.
   means connected to said supply means for maintaining a constant water level in said tank to provide a constant head,
   a cylindrical collection drum of smaller diameter than said ring and tall relative to its diameter having its lower end at the bottom of the tank, having an imperforate top wall and a vertical wall that is imperforate for most of its height except for a short portion adjacent the bottom, where openings are provided, and
   a fine mesh screen covering said openings and of sufficient closeness to prevent the passage of solid salt particles while admitting the liquid saturated solution,
   outlet means through the upper end of said drum for withdrawing the saturated solution.

2. The briner of claim 1 wherein some of said nozzles point down at about 30° from horizontal and toward the center of the tank and some of said nozzles point down vertically.

3. The briner of claim 1 having two said support means, namely, an upper support means for use with kiln-dried salt and a lower support means for use with vacuum-refined salt.

4. The briner of claim 3 wherein said upper support means is located about one-half to one-third of the way between the botom and top of the tank and the lower support means is located about one-fifth to one-sixth of the way between the bottom and top and wherein the imperforate top of said drum is above said lower support means and below said upper support means.

5. The briner of claim 1 wherein said fine mesh screen is at least seventy mesh, or finer.

6. A briner including in combination:
   a vertically disposed brine-resistant tank having a bottom, vertical wall means, and an upper end, the inner surface of said vertical wall means providing an upper support means about one-third to one-half of the way up and a lower support means about one-sixth to one-fifth of the way up,
   a ring of plastic tubing carried by one said support means and movable to the other said support means, depending on the salt type being brined, and having two sets of nozzles, one directed vertically downwardly and one directed inwardly and downwardly at approximately thirty degrees to horizontal toward the interior of the tank,
   supply means for supplying water to said ring,
   means connected to said supply means for maintaining a constant water level in said tank to provide a constant head, a cylindrical collection drum of smaller diameter than said ring and tall relative to its diameter having its lower end lying at the bottom of the tank, having a vertical wall that is imperforate for most of its height except for a short portion adjacent the bottom, where openings are provided, fine mesh screen means covering said openings and of sufficient closeness to prevent the passage of solid salt particles while admitting the liquid saturated solution, and outlet means from the upper end of said drum for withdrawing the saturated salt solution.

7. The briner of claim 6 wherein several layers of said screen are provided, one on top of the other.

References Cited

UNITED STATES PATENTS

| | | | |
|---|---|---|---|
| 1,644,714 | 10/1927 | Eisenhower | 210—126 |
| 3,365,280 | 1/1968 | Heiss | 23—312 AH |
| 2,281,140 | 3/1942 | Courthope | 23—312 AH |
| 3,123,445 | 3/1964 | Heath | 23—312 AH |
| 2,576,315 | 11/1951 | Swartz | 210—190 X |
| 566,406 | 8/1896 | Metzger | 23—272 |
| 3,420,637 | 1/1969 | Halff | 23—272.8 |
| 3,220,552 | 11/1965 | Staats | 23—272 |
| 1,689,557 | 10/1928 | Nordell | 210—191 X |
| 805,276 | 11/1905 | Flitton | 23—272 X |
| 3,307,914 | 3/1967 | Heiss | 23—312 AH |

FOREIGN PATENTS

| | | |
|---|---|---|
| 637,912 | 3/1962 | Canada. |

WILBUR L. BASCOMB, Jr., Primary Examiner

S. J. EMERY, Assistant Examiner

U.S. Cl. X.R.

23—272.6, 311, 312 AH; 210—190, 269, 126